United States Patent
Shah et al.

(10) Patent No.: US 11,604,772 B2
(45) Date of Patent: *Mar. 14, 2023

(54) SELF-HEALING INFRASTRUCTURE FOR A DUAL-DATABASE SYSTEM

(71) Applicant: ServiceNow, Inc., Santa Clara, CA (US)

(72) Inventors: Siddharth Rajendra Shah, Kirkland, WA (US); Jeremy Norris, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/690,490

(22) Filed: Mar. 9, 2022

(65) Prior Publication Data

US 2022/0197871 A1    Jun. 23, 2022

Related U.S. Application Data

(63) Continuation of application No. 16/855,744, filed on Apr. 22, 2020, now Pat. No. 11,301,435.

(51) Int. Cl.
*G06F 16/182* (2019.01)
*G06F 16/17* (2019.01)
(Continued)

(52) U.S. Cl.
CPC ........ *G06F 16/1844* (2019.01); *G06F 16/168* (2019.01); *G06F 16/1734* (2019.01); *G06F 16/211* (2019.01); *G06F 16/221* (2019.01)

(58) Field of Classification Search
CPC .... G06F 16/168; G06F 16/211; G06F 16/221; G06F 16/1734; G06F 16/1844
See application file for complete search history.

(56) References Cited

U.S. PATENT DOCUMENTS 4,941,084 A   7/1990  Terada et al.
5,185,860 A   2/1993  Wu
(Continued)

FOREIGN PATENT DOCUMENTS

EP   0433979    6/1991
EP   1607824   12/2005
(Continued)

*Primary Examiner* — Angelica Ruiz
(74) *Attorney, Agent, or Firm* — McDonnell Boehnen Hulbert & Berghoff LLP

(57) ABSTRACT

A database system could include a first database engine, a second database engine, and a replication engine. The database system could also include processors configured to perform operations. The operations could involve obtaining indicators that are respectively associated with performance issues that can occur in the database system, each indicator defining one or more conditions that, when satisfied, cause the indicator to become active. The operations could also involve obtaining mappings between: (i) at least some of the indicators, and (ii) remediation subroutines. The operations could additionally involve receiving operational data related to the first database engine, the second database engine, or the replication engine; determining, based on the operational data and the conditions defined by the indicators, that a particular indicator is active; determining, based on the mappings, that the particular indicator has an associated remediation subroutine; and executing the associated remediation subroutine.

20 Claims, 13 Drawing Sheets

| INDICATOR ID | CONDITIONS | STATUS |
|---|---|---|
| INDICATOR 810 | SEEDING = TRUE AND PERSISTING >= 3 HRS | INACTIVE |
| INDICATOR 820 | MAINTENANCE = TRUE AND PERSISTING >= 1 HR | ACTIVE |
| INDICATOR 830 | REPLICATEDDB_UPTIME > 6HRS | ACTIVE |
| INDICATOR 840 | ALIVE = FALSE AND MAINTENANCE = FALSE | ACTIVE |
| INDICATOR 850 | REPLICATEDDB_CREDENTIAL_IS_FAULTY = TRUE | ACTIVE |
| INDICATOR 860 | DISK_UTILIZATION >= 90% | ACTIVE |
| INDICATOR 870 | TIME_SINCE_LAST_MAINTENANCE >= 20 MIN AND REPLICATION_LAG > 5MIN | ACTIVE |
| INDICATOR 880 | TIME_SINCE_LAST_MAINTENANCE >= 6HRS | ACTIVE |
| INDICATOR 890 | TIME_SINCE_LAST_REPLICATION > =3HRS | ACTIVE |

800

(51) Int. Cl.
*G06F 16/22* (2019.01)
*G06F 16/21* (2019.01)
*G06F 16/16* (2019.01)

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Frinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,818,940 B2 * | 8/2014 | Lai ..................... G06F 16/2358 707/618 |
| 9,053,460 B2 | 6/2015 | Gilbert et al. |
| 10,216,621 B1 * | 2/2019 | Rutten ................ G06F 11/3616 |
| 10,621,077 B2 * | 4/2020 | Wiener ..................... G06F 8/71 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,210,274 B2 * | 12/2021 | Sukumaran ......... G06F 16/1734 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0191884 A1 | 7/2010 | Holenstein et al. |
| 2014/0153924 A1 * | 6/2014 | deRuijter ............. H04B 10/275 398/58 |
| 2016/0196320 A1 | 7/2016 | Borowiec et al. |
| 2018/0123940 A1 | 5/2018 | Rimar et al. |
| 2018/0150362 A1 | 5/2018 | Lee et al. |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2021/0194764 A1 | 6/2021 | Badyan et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

| INDICATOR ID | CONDITIONS | STATUS |
| --- | --- | --- |
| INDICATOR 810 | SEEDING = TRUE AND PERSISTING >= 3 HRS | INACTIVE |
| INDICATOR 820 | MAINTENANCE = TRUE AND PERSISTING >= 1 HR | ACTIVE |
| INDICATOR 830 | REPLICATEDDB_UPTIME > 6HRS | ACTIVE |
| INDICATOR 840 | ALIVE = FALSE AND MAINTENANCE = FALSE | ACTIVE |
| INDICATOR 850 | REPLICATEDDB_CREDENTIAL_IS_FAULTY = TRUE | ACTIVE |
| INDICATOR 860 | DISK_UTILIZATION >= 90% | ACTIVE |
| INDICATOR 870 | TIME_SINCE_LAST_MAINTENANCE >= 20 MIN AND REPLICATION_LAG > 5MIN | ACTIVE |
| INDICATOR 880 | TIME_SINCE_LAST_MAINTENANCE >= 6HRS | ACTIVE |
| INDICATOR 890 | TIME_SINCE_LAST_REPLICATION > =3HRS | ACTIVE |

FIG. 8

```
┌─────────────────────────────────────────────────────────────────┐
│ OBTAIN A SET OF INDICATORS THAT ARE RESPECTIVELY ASSOCIATED WITH│
│ PERFORMANCE ISSUES THAT CAN OCCUR IN A DATABASE SYSTEM, WHERE   │
│ EACH RESPECTIVE INDICATOR DEFINES ONE OR MORE CONDITIONS THAT,  │
│ WHEN SATISFIED, CAUSE THE RESPECTIVE INDICATOR TO BECOME ACTIVE,│
│ WHERE THE DATABASE SYSTEM CONTAINS A FIRST DATABASE ENGINE, A   │
│ SECOND DATABASE ENGINE, AND A REPLICATION ENGINE CONFIGURED TO  │  ← 1200
│ PERFORM: (I) A REPLICATION PROCESS TO REPLICATE ENTRIES FROM THE│
│ FIRST DATABASE ENGINE TO THE SECOND DATABASE ENGINE, AND (II) A │
│ DEFRAGMENTATION PROCESS TO DEFRAGMENT THE ENTRIES THAT ARE IN   │
│ THE SECOND DATABASE ENGINE, AND WHERE THE ONE OR MORE CONDITIONS│
│ RELATE TO THE FIRST DATABASE ENGINE, THE SECOND DATABASE ENGINE,│
│ THE REPLICATION ENGINE, THE REPLICATION PROCESS, OR THE         │
│ DEFRAGMENTATION PROCESS                                         │
└─────────────────────────────────────────────────────────────────┘
                                 ↓
┌─────────────────────────────────────────────────────────────────┐
│ OBTAIN A SET OF MAPPINGS BETWEEN: (I) AT LEAST SOME OF THE SET OF│ ← 1210
│     INDICATORS, AND (II) REMEDIATION SUBROUTINES                │
└─────────────────────────────────────────────────────────────────┘
                                 ↓
┌─────────────────────────────────────────────────────────────────┐
│ RECEIVE OPERATIONAL DATA RELATED TO ONE OR MORE OF THE FIRST    │
│ DATABASE ENGINE, THE SECOND DATABASE ENGINE, THE REPLICATION    │ ← 1220
│ ENGINE, THE REPLICATION PROCESS, OR THE DEFRAGMENTATION PROCESS.│
└─────────────────────────────────────────────────────────────────┘
                                 ↓
┌─────────────────────────────────────────────────────────────────┐
│ DETERMINE, BASED ON THE OPERATIONAL DATA AND THE CONDITIONS     │
│ DEFINED BY THE SET OF INDICATORS, THAT A PARTICULAR INDICATOR IS│ ← 1230
│                           ACTIVE                                │
└─────────────────────────────────────────────────────────────────┘
                                 ↓
┌─────────────────────────────────────────────────────────────────┐
│ RESPONSIVE TO THE PARTICULAR INDICATOR BEING ACTIVE, DETERMINE, │
│ BASED ON THE SET OF MAPPINGS, THAT THE PARTICULAR INDICATOR HAS AN│ ← 1240
│              ASSOCIATED REMEDIATION SUBROUTINE                  │
└─────────────────────────────────────────────────────────────────┘
                                 ↓
┌─────────────────────────────────────────────────────────────────┐
│           EXECUTE THE ASSOCIATED REMEDIATION SUBROUTINE         │ ← 1250
└─────────────────────────────────────────────────────────────────┘
```

FIG. 12

SELF-HEALING INFRASTRUCTURE FOR A DUAL-DATABASE SYSTEM

CROSS-REFERENCE TO RELATED APPLICATION

This application is a continuation of and claims priority to U.S. patent application Ser. No. 16/855,744, filed Apr. 22, 2020, which is hereby incorporated by reference in its entirety.

BACKGROUND

A computational instance may be disposed within a remote network management platform and may be dedicated to a managed network. The computational instance may store data related to the managed network, for example, in an authoritative database that acts as a single source of truth for the managed network.

During operations, users from the managed network may request data from the computational instance. These data requests could take the form of database queries that retrieve various pieces of information from the authoritative database. However, if the authoritative database contains a large amount of records, perhaps millions or even billions of records, then the database queries could experience severe delays. This in turn could negatively affect the overall experience of the users.

SUMMARY

To reduce database query delays, a computational instance could put into operation a dual-database system. Such a system may contain a first database engine and a second database engine. The first database engine could be an authoritative database for the dual-database system. The second database engine could be a read-only replica of the first database engine and could be configured with a technology that allows for efficient querying. For example, the second database engine could be configured as a column-oriented database engine.

During operations, a routing engine could receive database queries and appropriately route the queries to either the first database engine or the second database engine. If a database query requires a fast response time, for example, in order to display information on a web page, then the routing engine may route the query to the second database engine. On the other hand, if a database query does not require a fast response time but instead requires authoritative data, for example, in order to generate a financial audit report, then the routing engine may route the query to the first database engine.

The dual-database system could also contain other components. For example, the dual-database system could include a replication engine that replicates data from the first database engine to the second database engine. Additionally, the dual-database system could include a defragmentation engine that defragments data added to the second database engine by the replication engine. Other components may also exist.

Despite best efforts on the part of software engineers, software systems are never foolproof. Thus, at times, the dual-database system could experience performance issues that cause it to perform sub-optimally or behave in an unintended way. For example, the dual-database system may inadvertently shut down, reject incoming database queries, or produce incorrect outputs, among other possibilities. Such performance issues may result, for example, from a software defect in the components in the dual-database system.

Upon discovering a performance issue, a user could submit a support ticket to an entity associated with the dual-database system. An agent from the entity may be assigned to troubleshoot the performance issue raised by the ticket. In a typical troubleshooting process, the assigned agent may examine portions of dual-database system in an attempt to identify the components of the dual-database system that might encompass the performance issue. For instance, the assigned agent may examine log files, application source code files, and the like. Yet, if the assigned agent is not otherwise familiar with aspects of the dual-database system, this troubleshooting process can become overly complex and time consuming. Further, even after identifying the components that encompass the performance issue, formulating an appropriate response to get the dual-database system fully restored may take days or even weeks, as the agent may have limited resources with which to address the performance issue. And through all that time, the dual-database system may be performing sub-optimally and the user's activities may be negatively impacted.

Disclosed herein is an approach to address this technical problem. In accordance with the disclosure, a computational instance may include an infrastructure remediation tool that can pinpoint and automatically resolve performance issues in a dual-database system. The infrastructure remediation could have access to operational data from each of the components of the dual-database system. Additionally, the infrastructure remediation tool could be configured with a set of performance issue indicators, each indicator containing one or more conditions. If the operational data from the dual-database system satisfies the conditions for a performance issue indicator, the infrastructure remediation tool could determine that that indicator is "active." Otherwise, if the operational data from the dual-database system does not satisfy the conditions for a performance issue indicator, the infrastructure remediation tool could determine that that indicator is "inactive."

The infrastructure remediation tool could also be configured with mappings between performance issue indicators and subroutines that can be executed by the computational instance to remedy the corresponding performance issues raised by the indicators. Accordingly, upon determining that an indicator is active, the infrastructure remediation tool could refer to the mappings to determine an appropriate subroutine that will remedy the performance issue raised by the indicator. The infrastructure remediation tool could then execute that subroutine. After executing the subroutine, the infrastructure remediation tool could establish whether the subroutine actually succeeded in remediating the performance issue by determining if the indicator is still active. If the subroutine did not succeed, the infrastructure remediation tool may escalate the performance issue to an assigned agent. Given that a dual-database system could experience hundreds, if not thousands of performance issues, the disclosed infrastructure remediation tool advantageously allows dual-database systems to remediate performance issues without the need for external assistance, and thus allowing the dual-database system to "self-heal." Further, the disclosed infrastructure remediation tool also reduces the number of performance issues that are escalated to agents, thereby allowing the agents to focus on other, potentially higher-level issues. Other advantages may also exist.

Accordingly, a first example embodiment may involve a database system. The database system could include a first database engine, a second database engine, and a replication engine configured to perform: (i) a replication process to replicate entries from the first database engine to the second database engine, and (ii) a defragmentation process to defragment the entries that are in the second database engine. The database system could also include one or more processors configured to perform operations. The operations could involve obtaining a set of indicators that are respectively associated with performance issues that can occur in the database system. Each respective indicator may define one or more conditions that, when satisfied, cause the respective indicator to become active. The one or more conditions may relate to the first database engine, the second database engine, the replication engine, the replication process, or the defragmentation process. The operations could also involve obtaining a set of mappings between: (i) at least some of the set of indicators, and (ii) remediation subroutines. The operations could additionally involve receiving operational data related to one or more of the first database engine, the second database engine, the replication engine, the replication process, or the defragmentation process. The operations could further involve determining, based on the operational data and the conditions defined by the set of indicators, that a particular indicator is active. The operations could yet further involve, responsive to the particular indicator being active, determining, based on the set of mappings, that the particular indicator has an associated remediation subroutine. The operations could also involve executing the associated remediation subroutine.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts a table of performance issue indicators, in accordance with example embodiments.

FIG. 12 is a flow chart, in accordance with example embodiments.

DETAILED DESCRIPTION

Figure 1:
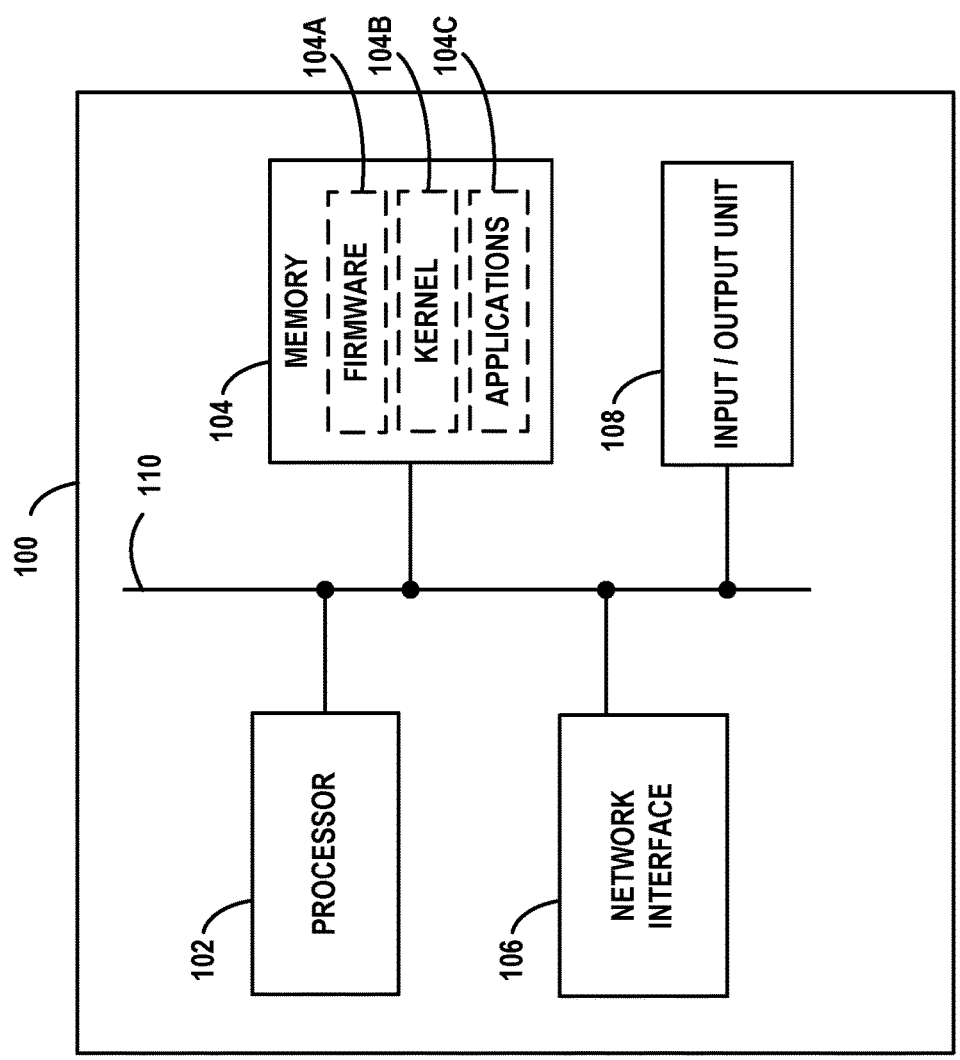
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
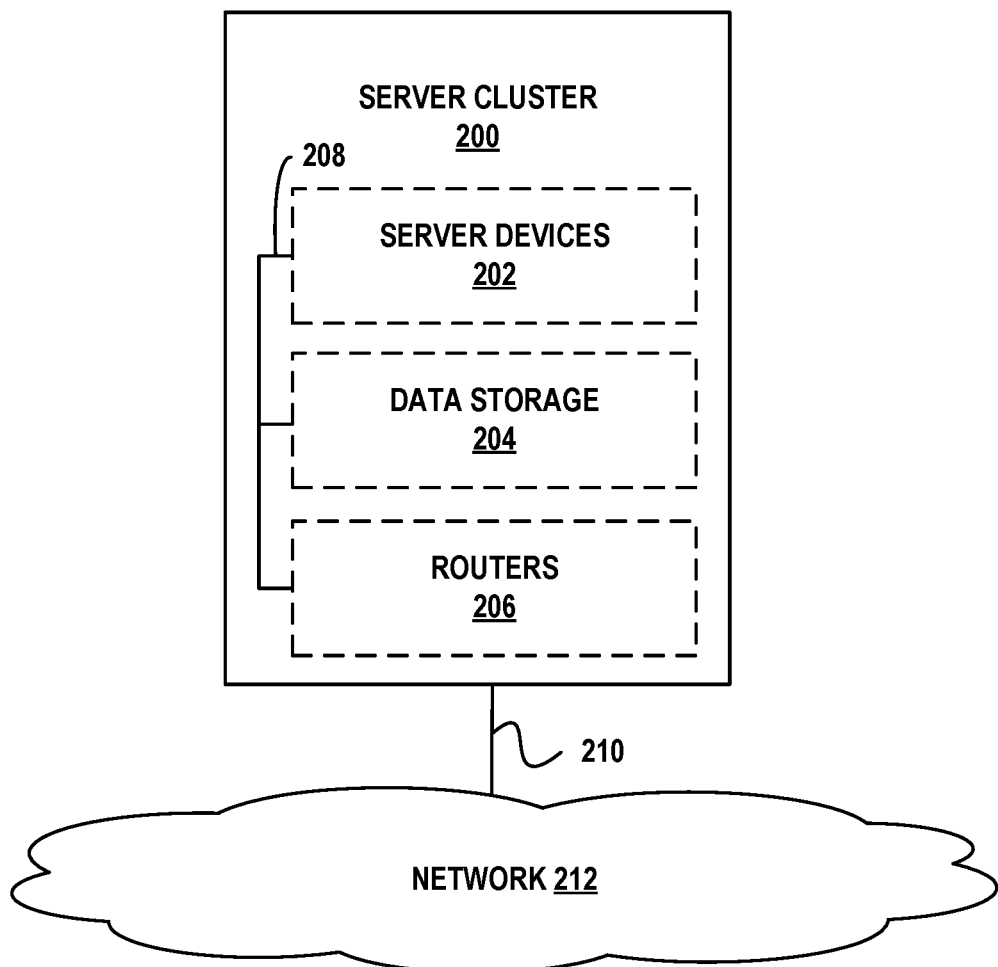
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
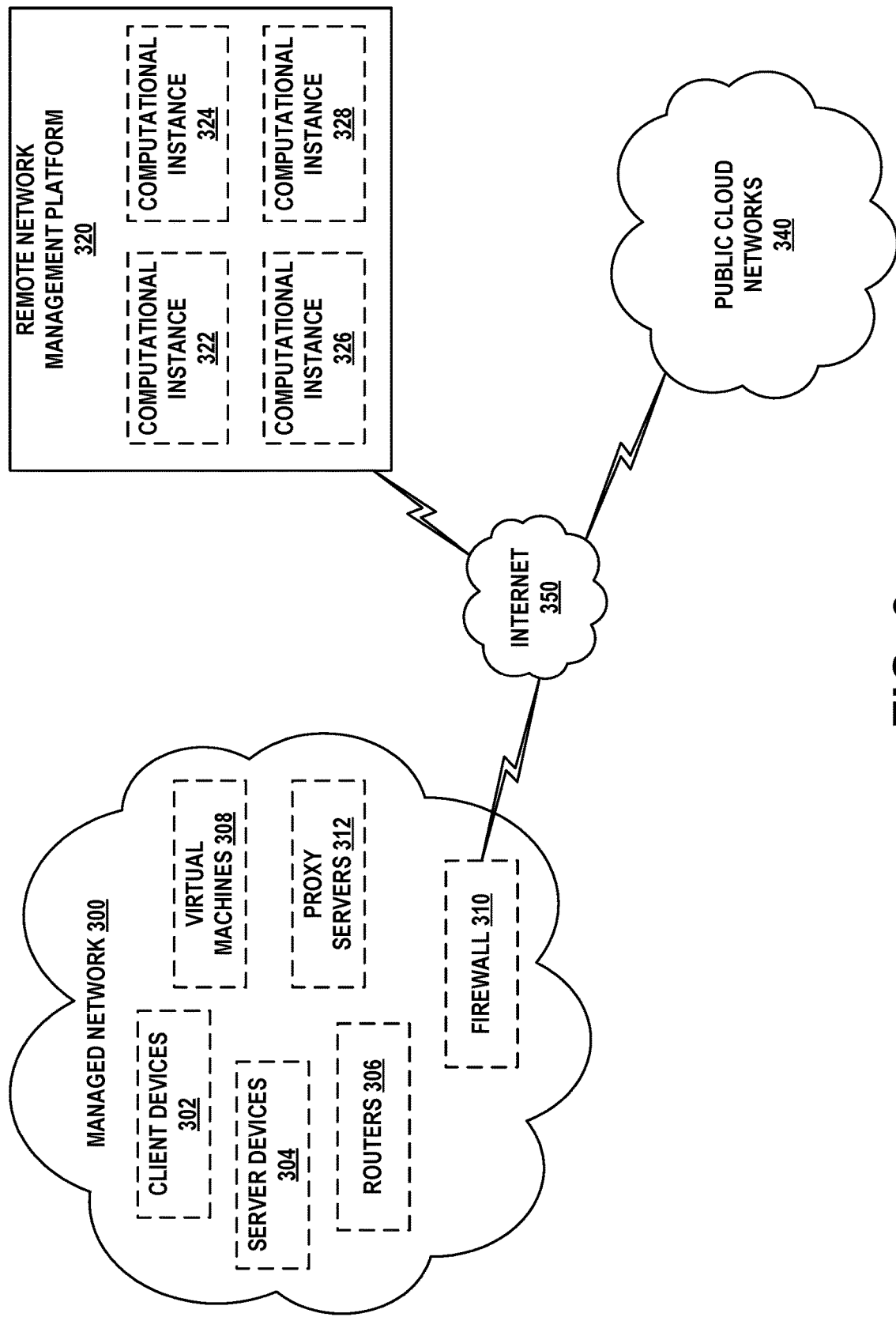
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
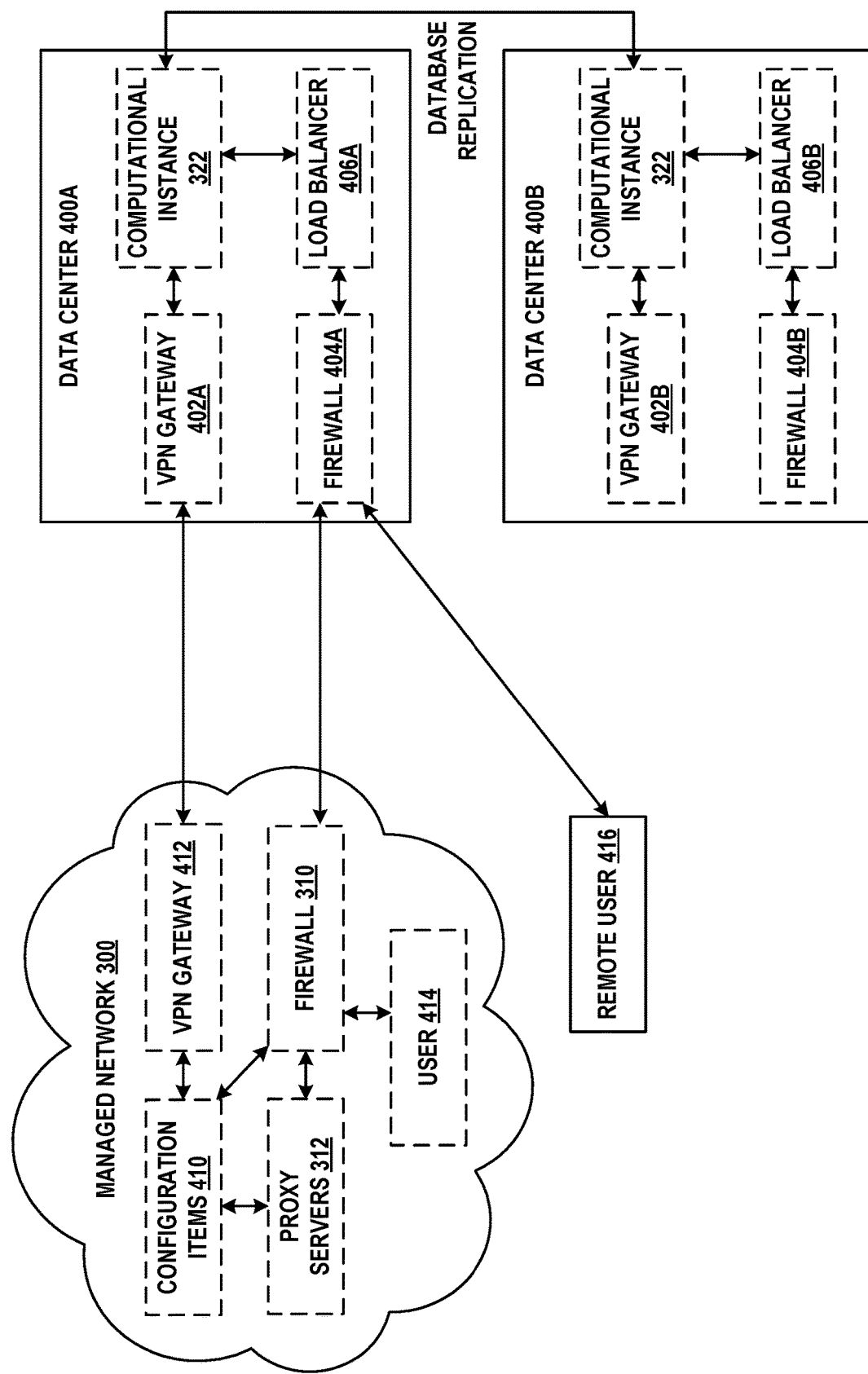
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
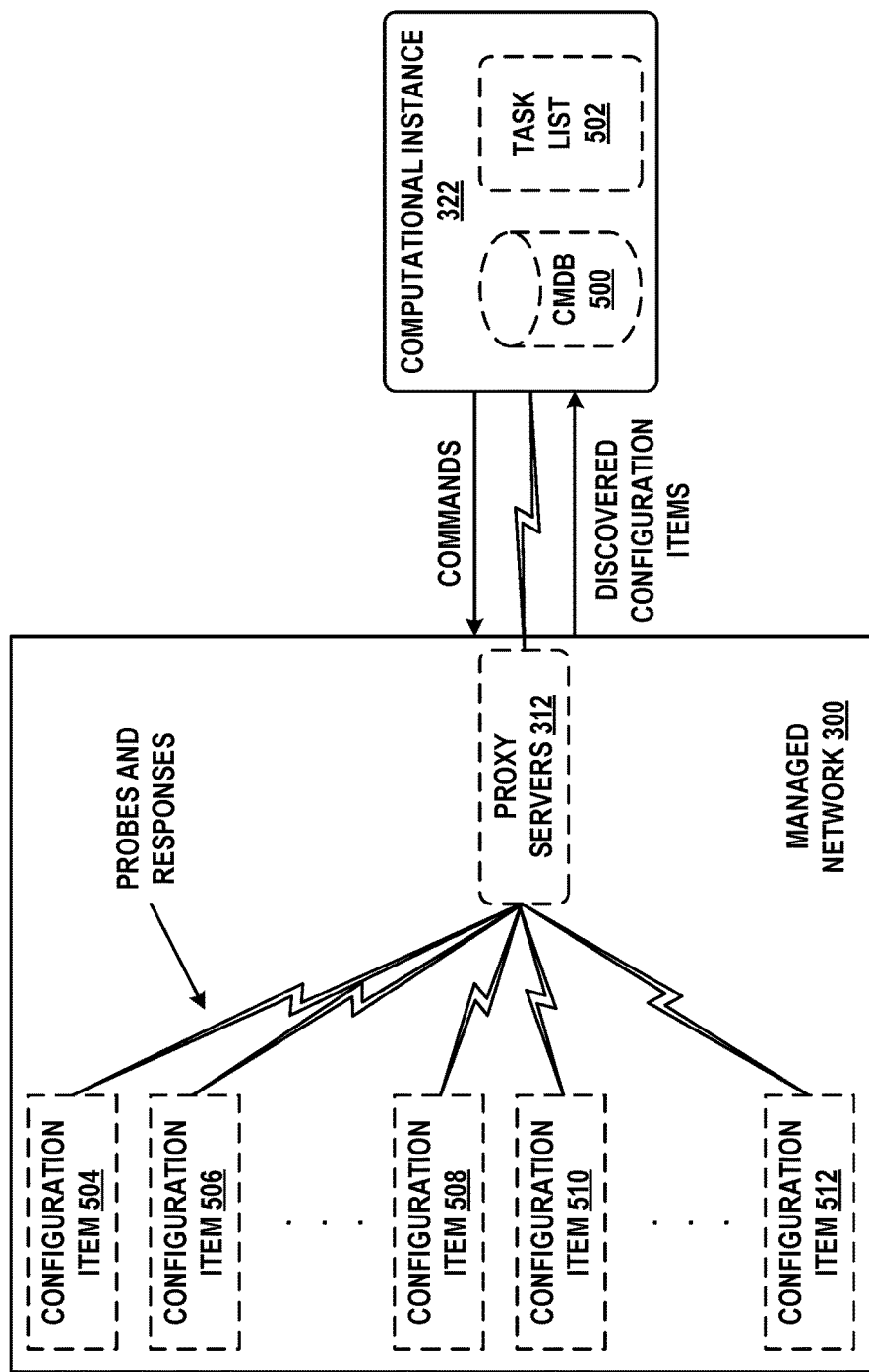
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
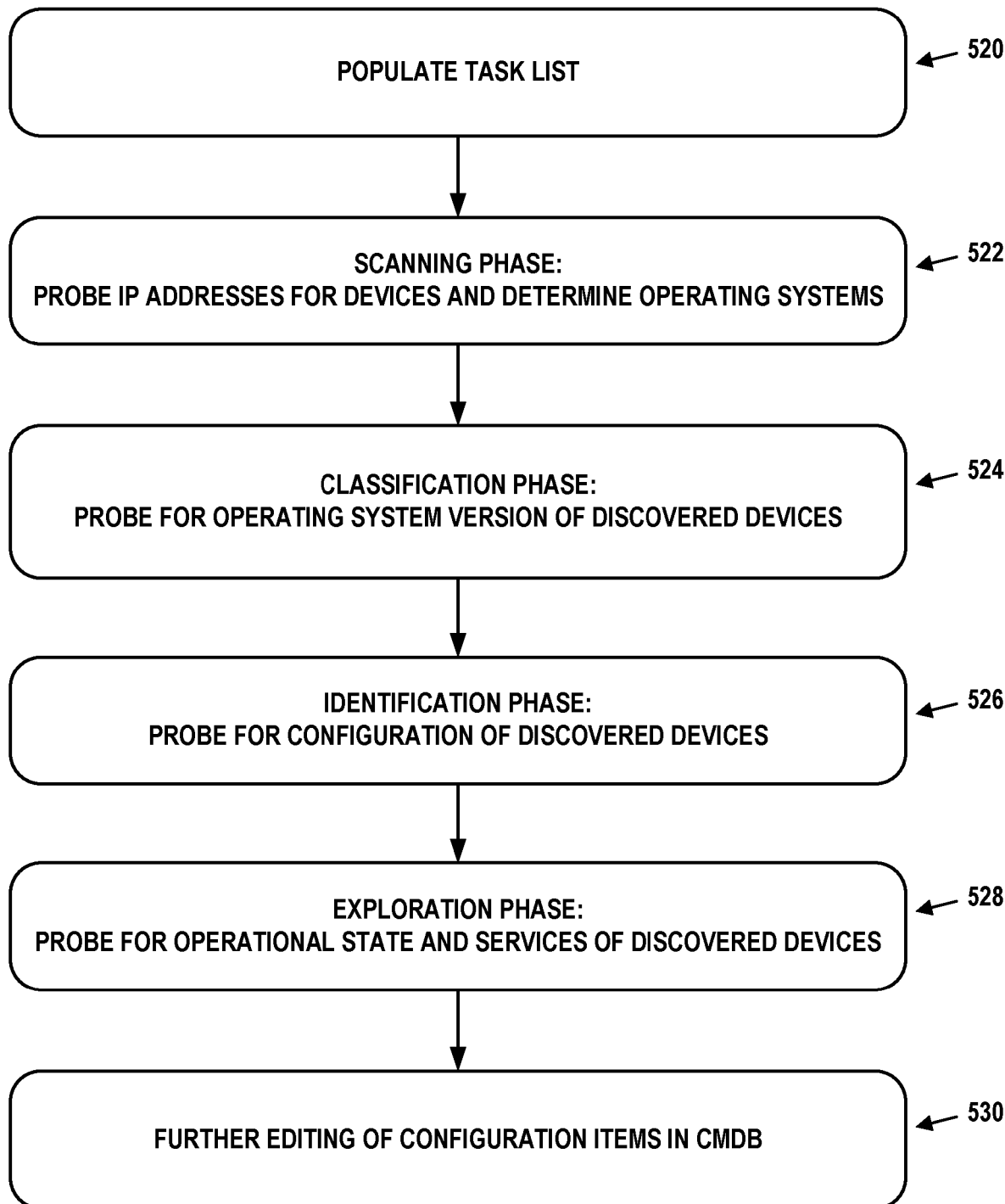
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Infrastructure Remediation Tools

As discussed above, computational instance 322 could put into operation a dual-database system to reduce database query delays. Such a system may contain a first database engine and a second database engine. The first database engine could be an authoritative database for the dual-database system. The second database engine could be a read-only replica of the first database engine and could be configured with a technology that allows for efficient querying. During operations, a routing engine could receive database queries directed to the dual-database system and appropriately route the queries to either the first database engine or the second database engine.

Sometimes, however, the dual-database system could experience performance issues that cause it to perform sub-optimally or behave in an unintended way. Upon discovering a performance issue, a user could submit a support ticket and an agent may be assigned to troubleshoot the performance issue raised by the ticket. During the troubleshooting process, the assigned agent may examine portions of the dual-database system in an attempt to identify components of the dual-database system that encompass the performance issue. Yet, if the assigned agent is not otherwise familiar with aspects of the dual-database system, this troubleshooting process can become overly complex and time consuming. Further, even after identifying the components that encompass the performance issue, formulating an appropriate response to get the dual-database system fully restored may take days or even weeks, as the agent may have limited resources with which to resolve the performance issue.

To address this and other issues, remote network management platform 320 may include an infrastructure remediation tool that can pinpoint and automatically resolve performance issues in a dual-database system. The infrastructure remediation tool could take the form of a background process, an executable application, or the like. The disclosed infrastructure remediation tool could locate and resolve performance issues within dual-database systems operating in various computational instances within remote network management platform 320. For example, the infrastructure remediation tool could pinpoint and automatically resolve performance issues in dual-database systems operating in computational instance 322, 324, and/or 326. For simplicity, examples will now be described using computational instance 322. However, the disclosed principles could apply in other scenarios with other computational instances as well.

Figure 6:
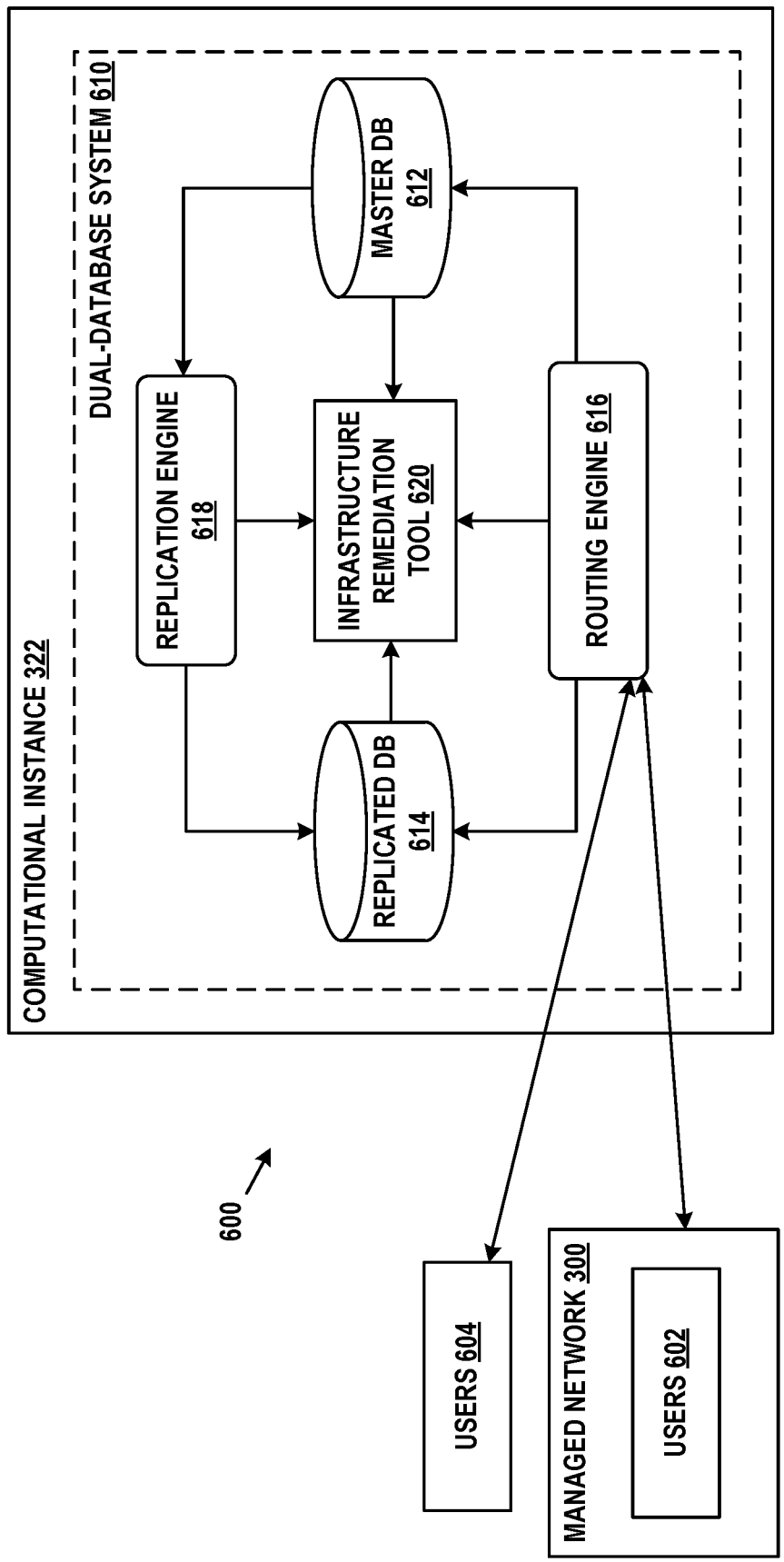
FIG. 6 depicts a network architecture, in accordance with example embodiments.

FIG. 6 depicts network architecture 600, in accordance with example embodiments. Network architecture 600 includes two main components, managed network 300 and computational instance 322, which may be communicatively connected by way of a network, such as Internet 350.

Herein, the term "performance issues" is to be interpreted broadly unless context suggests otherwise. Thus, performance issues may relate to the availability, correctness, throughput, latency, or any other relevant aspect of any component of a dual-database system.

Further, unless context suggests otherwise, a "performance issue" is not solely limited to a single aspect or component of a dual-database system. For example, in some cases, a performance issue could encompass multiple aspects or components of the dual-database system. When viewed individually, each of these multiple aspects or component may be observed to be functioning normally. However, when viewed in aggregate, the multiple aspects or components could suggest a composite performance issue within the dual-database system.

As noted above, managed network 300 may be an enterprise network used by entity for computing and communication tasks, as well as storage of data. In examples, managed network 300 may utilize one or more database engines contained within computational instance 322.

Users 602 and users 604 can represent people or sources (e.g., another enterprise) that use the database engines provided by computational instance 322. In example embodiments, users 602 may represent people that work for the entity associated with managed network 300, such as engineers, scientists, managers, accountants, financial analysts, IT staff, and so on, whereas users 604 may correspond to people outside of the entity associated with managed network 300.

Computational instance 322 may be disposed within remote network management platform 320 and may be dedicated to managed network 300. Computational instance 322 may store discovered configuration items that represent the environment of managed network 300. Computational instance 322 could include dual-database system 610, which may take the form of a series of interconnected server devices (e.g., a plurality of server clusters such as server cluster 200) that can be used for computation, data storage, communication, and other operations. In some embodiments, some or all of the devices of dual-database system 610 may be disposed in a remote network, such as public cloud networks 340, and may be communicatively connected to computational instance 322.

In line with the discussion above, dual-database system 610 may be a database system designed to reduce database query delays. As show in FIG. 6, dual-database system 610 may contain master database engine 612, replicated database engine 614, routing engine 616, replication engine 618, and infrastructure remediation tool 620. However, in other implementations, dual-database system 610 could include a fewer number of components, a greater number of components, or other types of components.

Master database engine 612 could be an authoritative database of engine dual-database system 610. That is, master database engine 612 may act as a single source of truth for data within dual-database system 610. As an example, if another database engine in dual-database system 610 contained information that conflicted with information in master database engine 612, computational instance 322 would use the information in master database engine 612 rather than the other database engine. During operations, users 602 and/or 604 could query data from master database engine 612 and write data to master database engine 612. In example embodiments, master database engine 612 may take the form of a row-oriented database engine, such as MARIADB®, AMAZON® AURORA®, and/or another row-oriented database engine. Further, in some embodiments, master database engine 612 could take the form of CMDB 500.

Replicated database engine 614 could be a replica of master database engine 612. That is, replicated database engine 614 may contain copies of at least some of the records in master database engine 612. During operations, users 602 and/or 604 could query data from replicated database engine 614 but may be prevented from writing data to replicated database engine 614. In example embodiments, replicated database engine 614 could be configured with a technology that allows for efficient querying. For example, replicated database engine 614 could take the form of a column-oriented database engine, such as MONETDB®, AMAZON® REDSHIFT®, and/or another column-oriented database engine.

In some embodiments, master database engine 612 may be an SQL-based database and replicated database engine 614 may be a NoSQL-based database. The former uses tables and exhibits lower-latency writes but higher-latency reads. The latter generally uses some form of flat files and exhibits lower-latency reads but higher-latency writes.

Routing engine 616 may be configured to receive database queries directed toward dual-database system 610 and appropriately route those database queries to either master database engine 612 or replicated database engine 614. Routing engine 616 could use various routing rules to determine which database engine to assign an incoming query. Such routing rules may organize incoming queries based on various criteria. As one example, routing engine 616 may consider the origination point of a database query when deciding where to route the query. For instance, if the database query originates from a web application—which typically require a fast response time—then routing engine 616 may route the query to replicated database engine 614. On the other hand, if the query originates from a financial auditing tool—which typically require authoritative data—then routing engine 616 may route the query to master database engine 612. As another example, routing engine 616 may factor the customer or employee status of the user submitting the database query. For instance, if a database query originates from a user with a very important person (VIP) status, then routing engine 616 may route the query to replicated database engine 614. Notably, replicated database engine 614 may use other types of routing rules when deciding where to route an incoming database query.

Replication engine 618 may be configured to replicate data from master database engine 612 to replicated database engine 614. To do this, replication engine 618 may perform various types of replication processes. For example, if a record is in master database engine 612 but not in replicated database engine 614, replication engine 618 may perform a replication process that involves inserting that record into replicated database engine 614. As another example, if replicated database engine 614 contains a particular record and master database engine 612 contains an updated version of that particular record, replication engine 618 may perform a replication process that involves deleting the particular record from replicated database engine 614 and then inserting the updated version of that particular record into replicated database engine 614.

In some embodiments, as a result of the replication processes performed by replication engine 618, the data in replicated database engine 614 could become fragmented. That is, related pieces of data in replicated database engine 614 may be broken up into non-contiguous data blocks that are stored at various locations in memory. To resolve this issue, replication engine 618 may also contain a data defragmentation component that performs a defragmentation process (e.g., a maintenance process) to rearrange the data stored in replicated database engine 614 so that related pieces of data are stored as contiguous data blocks in memory.

In line with the discussion above, occasionally, dual-database system 610 may experience a performance issue that causes it to perform sub-optimally or produce unexpected results. Upon discovering a performance issue, users 602 and/or 604 could submit a support ticket. An agent may be assigned to resolve the performance issue raised in the ticket, and may use the services of infrastructure remediation tool 620 in doing so. This agent may be an IT staff member, a software engineer, a customer service engineer, or some other entity.

As noted, infrastructure remediation tool 620 could be configured to pinpoint a set of performance issues in dual-database system 610. After identifying the set of performance issues, infrastructure remediation tool 620 could execute various subroutines to resolve those performance issues. If infrastructure remediation tool 620 cannot execute a subroutine (or if no subroutines exist for a particular performance issue), infrastructure remediation tool 620 could display the set of performance issues in a logical manner, perhaps on a graphical user interface. The agent could then use the graphical user interface to locate components in dual-database system 610 that may need to be manually readjusted.

To facilitate its operations, infrastructure remediation tool 620 may receive operational data from various components in dual-database system 610. For example, infrastructure remediation tool 620 may receive operational data from master database engine 612, replicated database engine 614, routing engine 616, replication engine 618, a defragmentation engine disposed within replication engine 618, and so on. As used herein, operational data is any data that relates to the operations of a particular component. In example embodiments, operational data from master database engine 612 may include data indicating when records were added, deleted, or updated, timestamps indicating when maintenance (e.g., defragmentation) has been performed on master database engine 612, and so on. Operational data from replicated database engine 614 may include timestamps indicating when maintenance has been performed on replicated database engine 614, timestamps indicating when seeding (i.e., a process in which an initial set of records are provided to a database engine) has occurred on replicated database engine 614, timestamps indicating when replicated database engine 614 became or was available to accept incoming queries, and so on. Operational data from routing engine 616 may include data indicating the volume of incoming queries over a period of time, the routing decisions for various queries, and so on. Operational data from replication engine 618 may include timestamps indicating when a replication process has been performed by replication engine 618, data on the lag of the replication process, and so on. Operational data from the defragmentation engine disposed within replication engine 618 may include timestamps indicating when a defragmentation process has been performed by the defragmentation engine, data on the lag of the defragmentation process, and so on. Notably, other examples of operational data may exist and are contemplated in the disclosure herein.

In example embodiments, a component may provide operational data to infrastructure remediation tool 620 in response to a trigger. Three main types of triggers may be supported. Record-based triggers may cause components to provide operational data when a change to one or more specific database records (e.g., one or more records in master database engine 612 and/or replicated database engine 614) occurs. These changes may include the creation of a record, the updating of a record, and the deletion of a record. Scheduled triggers may cause components to provide operational data at one or more specified times. Such a schedule may trigger a component to transmit operational data every second, every few minutes, daily, weekly, monthly, just once (at a specified time), or at a user-specified interval. Event-based triggers may cause components to provide operational data when an event occurs on dual-database system 610. For example, event-based triggers may be based on events occurring within replication engine 618 (e.g., the initiation of a replication process), events occurring within routing engine 616 (e.g., routing engine 616 routing a request to either replicated database engine 614 or master database engine 612), and perhaps other types of events. Other types of triggers could also be supported.

In line with the discussion above, infrastructure remediation tool 620 may enable the specification of various types of performance issue indicators based on the received operational data. A performance issue indicator, as used herein, is a specific series of logical conditions that, when satisfied by the operational data, cause the performance issue indicator to be "active." In some embodiments, performance issue indicators are configured through use of a software-based design tool. The tool could allow an indicator designer to define conditions, triggers, actions, input data, and other characteristics of the indicators. The design tool may utilize a GUI, and may be embodied as a series of one or more web pages and/or web-based applications deployed upon computational instance 322. In other embodiments, performance issue indicators can be configured programmatically. For example, the user from remote network management platform 320 could configure a performance issue indicator by modifying the source code or a configuration file of infrastructure remediation tool 620.

Figure 7:
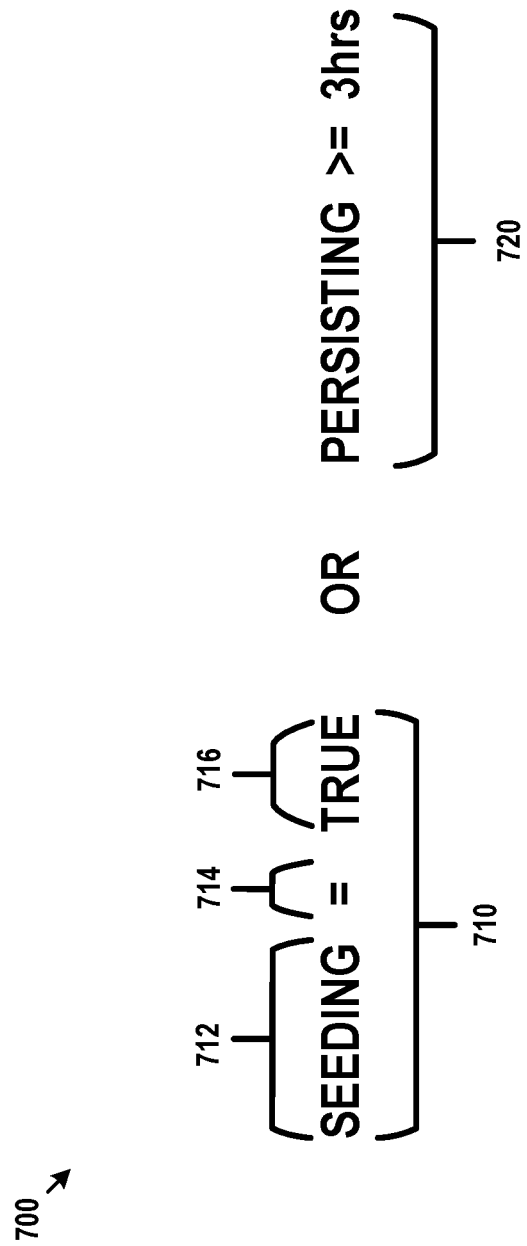
FIG. 7 depicts elements of a performance issue indicator, in accordance with example embodiments

FIG. 7 illustrates elements of a performance issue indicator, according to example embodiments. As shown, performance issue indicator 700 includes two separate conditions, condition 710 and condition 720, that are joined by a logical OR. This means that either condition 710 or condition 720 must be satisfied in order for performance issue indicator 700 to be considered as "active." As used herein, a condition may be a logical expression that compares an input metric to a criteria. If the logical expression holds true, then the condition is deemed as satisfied. A performance issue indicator may have multiple conditions, each of which can be joined together using logical ANDs/ORs.

As illustrated in FIG. 7, condition 710 includes three elements: input metric 712, operator 714, and criteria 716.

Input metric 712 could be a metric that is calculated based on operational data from dual-database system 610. In some examples, input metric 712 is a metric calculated from a single component. For instance, input metric 712 could be calculated just based on operational data received from replicated database engine 614. In other examples, input metric 712 may be a metric that is calculated based on operational data from multiple components. For instance, input metric 712 could be calculated based on operational data received from replication engine 618 and from routing engine 616. In the example illustrated in FIG. 7, input metric 712 is a variable named "seeding", which is a metric that captures whether replicated database engine 614 is performing a seeding operation.

Operator 714 is used to compare input metric 712 to criteria 716. If the comparison specified by operator 714 holds true, then condition 710 may be deemed as satisfied. In the example illustrated in FIG. 7, operator 714 takes the form of an "equal to" operator. However, other types of operators may be used, including "equal or greater than", "greater than", "greater than or equal to", "less than", and "less than or equal to", and so on.

Criteria 716 may be a user defined input that is compared against input metric 712. Criteria 716 may take the form of a Boolean value, a numerical value, a formulaic expression, a metric that represents operational data from dual-database system 610, or possibly another form. In the example illustrated in FIG. 7, criteria 716 takes the form of the Boolean value "TRUE".

FIG. 8 depicts a table containing various performance issue indicators, in accordance with example embodiments. As discussed above, the indicators in table 800 may be specified by a user from remote network management platform 320. This may be accomplished, for example, by a GUI provided by computational instance 322 to a user from remote network management platform 320 or may be accomplished programmatically. Infrastructure remediation tool 620 may monitor the indicators specified in table 800 to determine whether the conditions for the indicators are satisfied by operational data received from dual-database system 610. If the conditions for an indicator are satisfied, infrastructure remediation tool 620 may consider that indicator as being "active."

As shown, each performance issue indicator in table 800 includes entries for three columns: (i) indicator ID column, which provides a unique identifier for the indicator, (ii) conditions column, which outlines the conditions for the indicator, and (iii) status column, which indicates whether the conditions for the indicator are satisfied by operational data received by infrastructure remediation tool 620 from dual-database system 610.

Indicator 810 may be a performance issue indicator that indicates whether replicated database engine 614 has been seeding for more than 3 hours. Accordingly, the operational data for indicator 810 (i.e., the input metric "seeding" and the input metric "persisting") may originate from replicated database engine 614. If replicated database engine 614 has been persisting for more than 3 hours and is in a seeding state, then the conditions for indicator 810 may be satisfied and the status column for indicator 810 may be "active." Otherwise, if replicated database engine 614 has not been persisting for more than 3 hours or is not in a seeding state, then the conditions for indicator 810 may not be satisfied and the status column for indicator 810 may be "inactive." In the example shown in FIG. 8, the status column for indicator 810 is "inactive," meaning that replicated database engine 614 has not been seeding for more than 3 hours.

Indicator 820 may be a performance issue indicator that indicates whether replicated database engine 614 has been undergoing a maintenance process (e.g., a defragmentation process) for more than 1 hour. Accordingly, the operational data for indicator 820 (i.e., the input metric "maintenance" and the input metric "persisting") may originate from replicated database engine 614 as well as replication engine 618. If replicated database engine 614 has been persisting for more than 1 hour and is in a maintenance state, then the conditions for indicator 820 may be satisfied and the status column for indicator 820 may be "active." Otherwise, if replicated database engine 614 has not been persisting for more than 1 hour or is not in a maintenance state, then the conditions for indicator 820 may not be satisfied and the status column for indicator 820 may be "inactive." In the example shown in FIG. 8, the status for indicator 820 is "active," meaning that replicated database engine 614 has been undergoing a maintenance process for more than 1 hour.

Indicator 830 may be a performance issue indicator that indicates whether replicated database engine 614 has been operating for more than 6 hours without being shut down. Accordingly, the operational data for indicator 830 (i.e., the input metric "replicatedDB_uptime") may originate from replicated database engine 614. If the uptime of replicated database engine 614 is greater than 6 hours, then the condition for indicator 830 may be satisfied and the status column for indicator 830 may be "active." Otherwise, if the uptime of replicated database engine 614 is not greater than 6 hours, then the condition for indicator 830 may not be satisfied and the status column for indicator 830 may be "inactive." In the example shown in FIG. 8, the status for indicator 830 is "active," meaning that replicated database engine 830 has operating for more than 6 hours without being shut down.

Indicator 840 may be a performance issue indicator that indicates whether replicated database engine 614 is able to accept incoming database queries and whether replicated database engine 614 is under maintenance. Accordingly, the operational data for indicator 840 (i.e., the input metric "alive" and the input metric "maintenance") may originate from replicated database engine 614. If replicated database engine 614 is not alive and is not in a maintenance state, then the conditions for indicator 840 may be satisfied and the status column for indicator 840 may be "active." Otherwise, if replicated database engine 614 is alive or is in a maintenance state, then the conditions for indicator 840 may not be satisfied and the status column for indicator 840 may be "inactive." In the example shown in FIG. 8, the status for indicator 840 is "active," meaning that replicated database engine 614 is unable to accept incoming database queries, even though it is not undergoing maintenance.

Indicator 850 may be a performance issue indicator that indicates whether the credentials to access replicated database engine 614 are faulty. Accordingly, the operational data for indicator 850 (i.e., the input metric "ReplicatedDB_Crediential_is_Faulty") may originate from replicated database engine 614. If the credentials to access replicated database engine 614 are faulty, then the condition for indicator 850 may be satisfied and the status column for indicator 850 may be "active." Otherwise, if the credentials to access replicated database engine 614 are not faulty, then the condition for indicator 850 may not be satisfied and the status column for indicator 850 may be "inactive." In the example shown in FIG. 8, the status for indicator 850 is "active," meaning the credentials to access replicated database engine 614 are faulty.

In some embodiments, the operational data provided to infrastructure remediation tool 620 may originate from infrastructure remediation tool 620 itself. For instance, indicator 860 may be a performance issue indicator that indicates whether the disk utilization of infrastructure remediation tool 620 is at or over 90%. Accordingly, the operational data for indicator 860 (i.e., the input metric "disk utilization") may originate from random access memory (RAM) disposed within infrastructure remediation tool 620. If the disk utilization of infrastructure remediation tool 620 is at or over 90%, then the condition for indicator 860 may be satisfied and the status column for indicator 860 may be "active." Otherwise, if the disk utilization of infrastructure remediation tool 620 is under 90%, then the condition for indicator 860 may not be satisfied and the status column for indicator 860 may be "inactive." In the example shown in FIG. 8, the status for indicator 860 is "active," meaning the disk utilization of infrastructure remediation tool 620 is at or over 90%. Due to this high disk utilization, infrastructure remediation tool 620 may be unable to cache, and therefore unable to evaluate, newer operational data.

Indicator 870 may be a performance issue indicator that indicates whether a maintenance process has been performed on replicated database engine 614 within the past 20 minutes (e.g., as determined by timestamps) and whether the lag of a replication process performed by replication engine 618 is greater than 5 minutes. Accordingly, the operational data for indicator 870 (i.e., the input metric "time_since_last_maintenance" and the input metric "replication_lag") may originate from replicated database engine 614 as well as replication engine 618. If a maintenance process has not been performed on replicated database engine 614 within the past 20 minutes and the lag of a replication process performed by replication engine 618 is greater than 5 minutes, then the condition for indicator 870 may be satisfied and the status column for indicator 870 may be "active." Otherwise, if a maintenance process has been performed on replicated database engine 614 within the past 20 minutes or if the lag of a replication process performed by replication engine 618 is not greater than 5 minutes, then the condition for indicator 870 may not be satisfied and the status column for indicator 870 may be "inactive." In the example shown in FIG. 8, the status for indicator 870 is "active," meaning that a maintenance process has not been performed on replicated database engine 614 within the past 20 minutes and the lag of a replication process performed by replication engine 618 is greater than 5 minutes.

Indicator 880 may be a performance issue indicator that indicates whether a maintenance process has been performed on replicated database engine 614 within the last 6 hours.

Accordingly, the operational data for indicator 880 (i.e., the input metric "time_since_last_maintenance") may originate from replicated database engine 614 as well as replication engine 618. If a maintenance process has not been performed on replicated database engine 614 within the last 6 hours, then the condition for indicator 880 may be satisfied and the status column for indicator 880 may be "active." Otherwise, if a maintenance process has been performed on replicated database engine 614 within the last 6 hours, then the condition for indicator 880 may not be satisfied and the status column for indicator 880 may be "inactive." In the example shown in FIG. 8, the status for indicator 880 is "active," meaning a maintenance process has not been performed on replicated database engine 614 within the last 6 hours.

Indicator 890 may be a performance issue indicator that indicates whether a replication process has been performed by replication engine 618 within the last 3 hours. Accordingly, the operational data for indicator 890 (i.e., the input metric "time_since_last_replication") may originate from replicated database engine 614 as well as replication engine 618. If a replication process has not been performed by replication engine 618 within the last 3 hours, then the condition for indicator 890 may be satisfied and the status column for indicator 890 may be "active." Otherwise, if a replication process has been performed by replication engine 618 within the last 3 hours, then the condition for indicator 890 may not be satisfied and the status column for indicator 890 may be "inactive." In the example shown in FIG. 8, the status for indicator 890 is "active," meaning a replication process has not been performed by replication engine 618 within the last 3 hours.

Notably, the indicators presented in FIG. 8 are used for the purpose of example and are not intended to be limiting with respect to the embodiments herein. In practice, table 800 could include a fewer number of indicators or a greater number of indicators, perhaps even hundreds or thousands. Further, other types of indicators are also possible and are contemplated in the disclosure herein.

Figure 9:
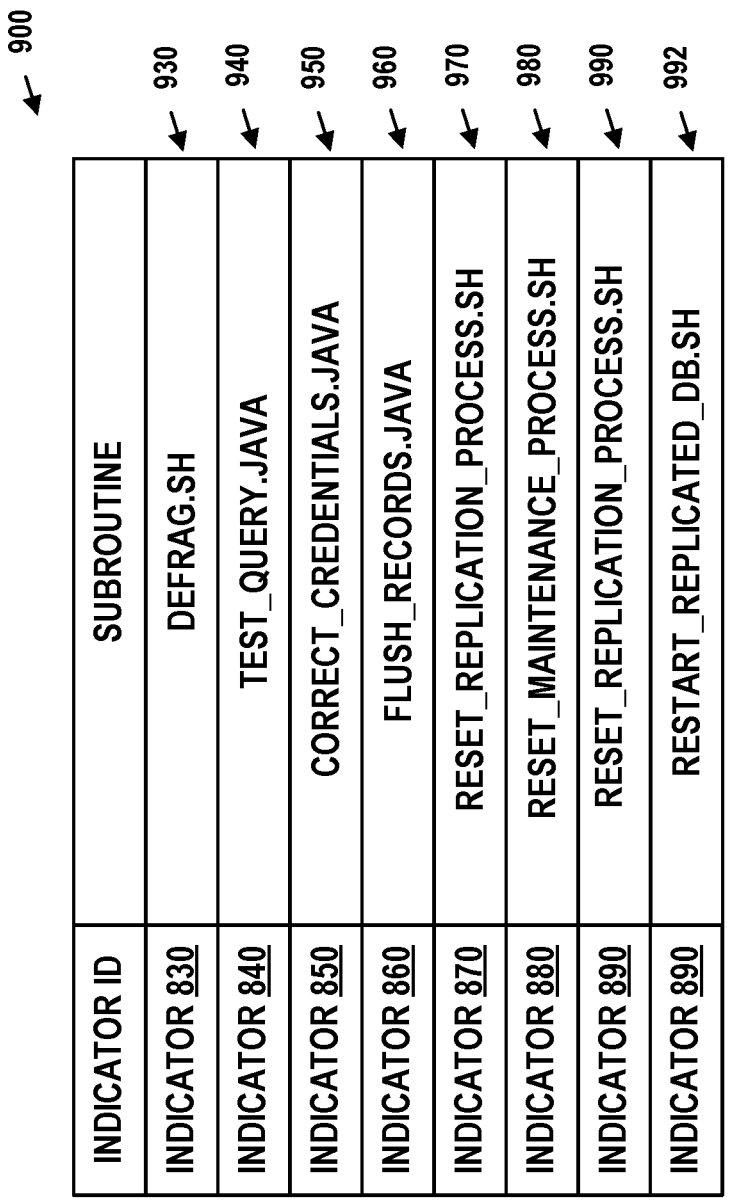
FIG. 9 depicts mappings between performance issue indicators and subroutines, in accordance with example embodiments.

FIG. 9 depicts a table containing mappings between performance issue indicators and subroutines, in accordance with example embodiments. As discussed above, the subroutines and the mappings in table 900 may be specified by a user from remote network management platform 320. This may be accomplished, for example, by a GUI provided by computational instance 322 to the user from remote network management platform 320 or may be accomplished programmatically. Infrastructure remediation tool 620 may monitor the performance issue indicators in table 800 to determine whether a performance issue indicator becomes "active." If a performance issue indicator becomes active and has an associated mapping in table 900, then infrastructure remediation tool 620 may execute the subroutine specified by the mapping. Otherwise, infrastructure remediation tool 620 may escalate the performance issue to an agent.

As shown, each mapping in table 900 includes entries for two columns: (i) indicator ID column, which contains unique identifiers corresponding to performance issues, and (ii) a subroutine column, which designates a filename (e.g., a pathname) for an executable subroutine. In example embodiments, a subroutine may take the form of object code, machine code, executable instructions, build instructions, configuration instructions, or the like.

Entry 930 is a mapping between indicator 830 and the subroutine "defrag.sh". This means that when indicator 830 becomes "active" (e.g., all the conditions for indicator 830 are satisfied), infrastructure remediation tool 620 will execute the subroutine "defrag.sh". In example embodiments, executing "defrag.sh" could initiate a defragmentation process on replicated database engine 614.

Entry 940 is a mapping between indicator 840 and the subroutine "test_query.java". This means that when indicator 840 becomes "active" (e.g., all the conditions for indicator 840 are satisfied), infrastructure remediation tool 620 will execute the subroutine "test_query.java". In example embodiments, executing "test_query.java" could run a test database query on replicated database engine 614 to confirm that replicated database engine 614 is healthy. If the test query returns a response, "test_query.java" could then change the input metric "alive" for replicated database engine 614 to "TRUE".

Entry 950 is a mapping between indicator 850 and the subroutine "correct_credentials.java". This means that when indicator 850 becomes "active" (e.g., all the conditions for indicator 850 are satisfied), infrastructure remediation tool 620 will execute the subroutine "correct_credential s.java". In example embodiments, executing "correct_credentials.java" could reset the authentication credentials for replicated database engine 614.

Entry 960 is a mapping between indicator 860 and the subroutine "flush_records.java". This means that when indicator 860 becomes "active" (e.g., all the conditions for indicator 860 are satisfied), infrastructure remediation tool 620 will execute the subroutine "flush_records.java". In example embodiments, executing "flush_records.java" could flush all operational data cached within infrastructure remediation tool 620 that have timestamps more than a day old, a week old, a month old, and so on.

Entry 970 is a mapping between indicator 870 and the subroutine "reset_replication_process.sh". This means that when indicator 870 becomes "active" (e.g., all the conditions for indicator 870 are satisfied), infrastructure remediation tool 620 will execute the subroutine "reset_replication_process.sh". In example embodiments, executing "reset_replication_process.sh" could reset a replication process being performed by replication engine 618, for example, by terminating and then restarting the replication process, modifying the frequency of the replication process, modifying the types of records that are to be replicated during the replication process, and so on.

Entry 980 is a mapping between indicator 880 and the subroutine "reset_maintenance_process.sh". This means that when indicator 880 becomes "active" (e.g., all the conditions for indicator 880 are satisfied), infrastructure remediation tool 620 will execute the subroutine "reset_maintenance_process.sh". In example embodiments, executing "reset_maintenance_process.sh" could reset a defragmentation process being performed by replication engine 618, for example, by terminating and then restarting the defragmentation process, modifying the frequency of the defragmentation process, modifying the types of records that are to be defragmented during the defragmentation process, and so on.

A remediation subroutine could be included as part of multiple mappings in mappings 900. For example, entry 990 includes a mapping between indicator 890 and the previously described subroutine "reset_replication_process.sh". This means that when indicator 890 becomes "active" (e.g., all the conditions for indicator 890 are satisfied), infrastructure remediation tool 620 will execute the subroutine "reset_replication_process.sh".

Further, an indicator could be included as part of multiple mappings in mappings 900. For example, entry 992 includes a mapping between indicator 890 and the remediation subroutine "restart_replicated_db.sh." This means that when indicator 890 becomes "active" (e.g., all the conditions for indicator 890 are satisfied), infrastructure remediation tool 620 could, in addition to executing the subroutine "reset_replication_process.sh," execute the subroutine "restart_replicated_db.sh." In example embodiments, executing "restart_replicated_db.sh" could restart replicated database engine 614.

In some embodiments, infrastructure remediation tool 620 executes remediation subroutines in parallel. For example, when indicator 890 becomes "active," infrastructure remediation tool 620 could simultaneously execute the subroutines "reset_replication_process.sh" and "restart_replicated_db.sh." In other embodiments, infrastructure remediation tool 620 executes remediation subroutines sequentially. For instance, when indicator 890 becomes "active," infrastructure remediation tool 620 could execute "reset_replication_process.sh" and then determine whether "reset_replication_process.sh" succeeded in resolving the performance issue raised by indicator 890. If "reset_replication_process.sh" did not succeed, then infrastructure remediation tool 620 could execute "restart_replicated_db.sh."

In example embodiments, infrastructure remediation tool 620 may determine the success rates of various remediation subroutines and may update mappings 900 based on those determined success rates. For instance, if infrastructure remediation tool 620 determines that a remediation subroutine has a threshold low success rate (e.g., did not remediate a performance issue a threshold number of times, did not remediate a performance issue a threshold percentage of times, etc.), then infrastructure remediation tool 620 could remove from mappings 900 all mappings in between that remediation subroutine and indicators that were unsuccessfully resolved by that remediation subroutine. On the other hand, if infrastructure remediation tool 620 determines that a remediation subroutine has a threshold high success rate (e.g., successfully remediated a performance issue a threshold number of times, successfully remediated a performance issue a threshold percentage of times, etc.), then infrastructure remediation tool 620 could add to mappings 900 mappings between that remediation subroutine and indicators that were successfully resolved by that remediation subroutine. Further, if infrastructure remediation tool 620 determines that remediation subroutine SUB_A has higher success rate than remediation subroutine SUB_B in resolving a particular indicator, then infrastructure remediation tool 620 could set remediation subroutine SUB_A as the first subroutine to be executed when that particular indicator becomes "active."

Mappings 900 do not contain entries for indicator 810 or indicator 820. This means that indicator 810 or indicator 820 do not have associated subroutines. Accordingly, if either indicator 810 or indicator 820 became "active," infrastructure remediation tool 620 would immediately escalate indicator 810 and indicator 820 to an agent rather than first performing an automated response.

Notably, the mappings presented in FIG. 9 are used for the purpose of example and are not intended to be limiting with respect to the embodiments herein. In practice, table 900 could include a fewer number of mappings or a greater number of mappings, perhaps even hundreds or thousands. Further, other types of mappings are also possible and are contemplated in the disclosure herein.

Figure 10:
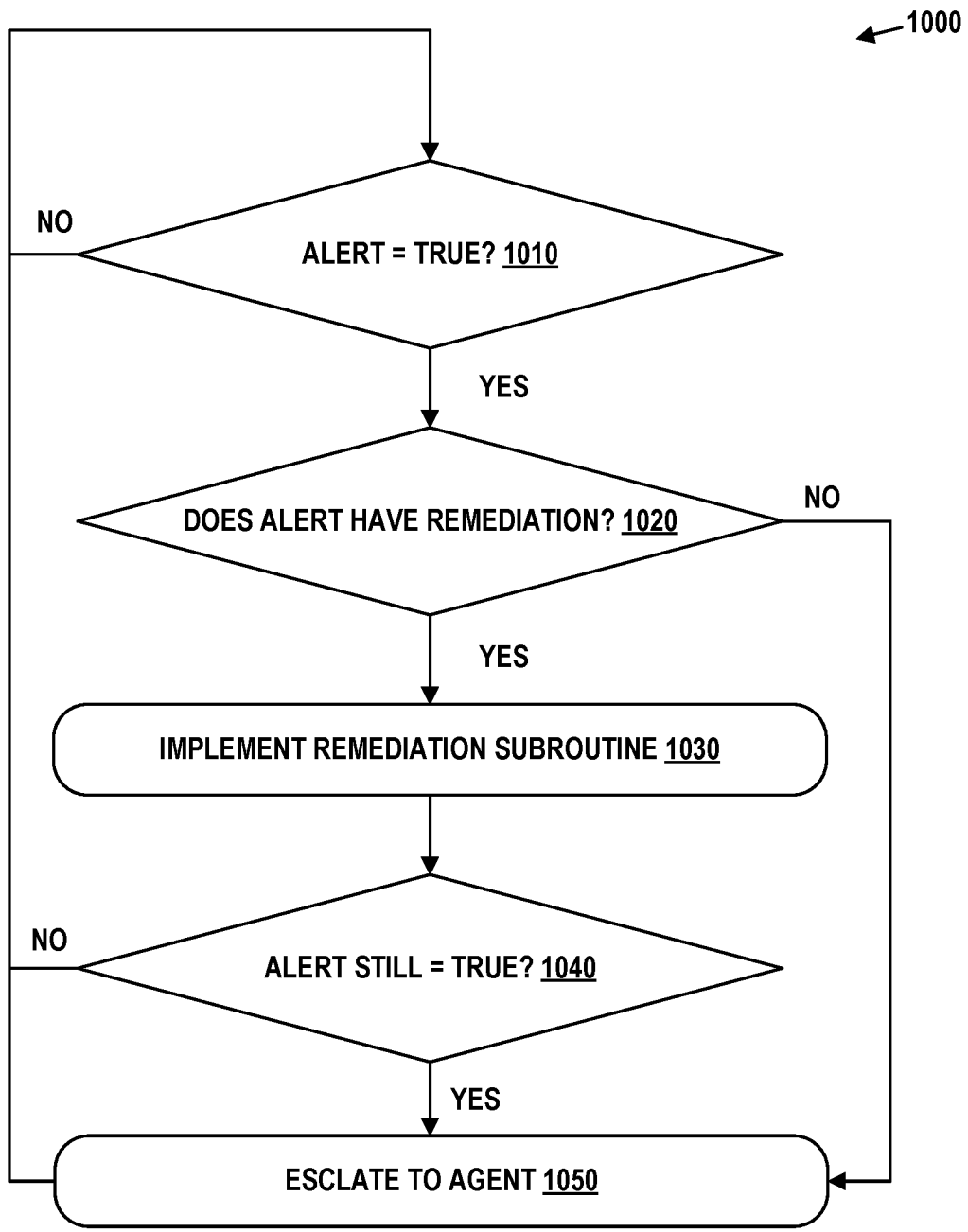
FIG. 10 is a flow chart illustrating example operations of an infrastructure remediation tool, in accordance with example embodiments.

Example operations of infrastructure remediation tool 620 are depicted as flow chart 1010 in FIG. 10. Flow chart 1000 may begin at block 1010, when infrastructure remediation tool 620 determines if any of the performance issue indicators specified in table 800 have a status of "active". As described above, a performance issue indicator may be "active" if all the conditions of the indicator are satisfied. If a performance issue indicator has a status of "active," flow chart 1000 may continue to block 1020 for that respective indicator. Otherwise, flow chart 1000 may remain at block 1010. In some embodiments, infrastructure remediation tool 620 could perform the operations at block 1010 in accordance with a pre-determined schedule. For example, every X seconds (e.g., X=5, 30, 60, 90, 150), infrastructure remediation tool 620 may perform the operations at block 1010 to determine if any of the performance issue indicators specified in table 800 have a status of "active."

At block 1020, infrastructure remediation tool 620 may determine whether the performance issue indicator from block 1010 has an associated subroutine. This could involve, for example, determining whether the performance issue indicator from block 1010 has an associated entry in table 900. If the performance issue indicator from block 1010 has an associated subroutine, flow chart 1000 may continue to block 1030. Otherwise, flow chart 1000 may continue to block 1050.

At block 1030, infrastructure remediation tool 620 may execute the associated subroutine from block 1020. In line with the discussion above, this could involve computational instance 322 executing object code, machine code, executable instructions, build instructions, configuration instructions, or the like. In some embodiments, block 1030 could involve executing multiple subroutines that are associated with the performance issue indicator from block 1010.

To determine if the subroutine actually succeeded in remediating the performance issue, at block 1040, infrastructure remediation tool 620 may determine whether the performance issue indicator from block 1010 still has a status of "active." If the indicator does not have a status of "active" (meaning that the subroutine executed at block 1030 succeeded in remediating the performance issue), flow chart 1000 may continue to back to block 1010. Otherwise, flow chart 1000 may continue to block 1050.

At block 1050, infrastructure remediation tool 620 could provide a GUI to an agent assigned to address the performance issue raised by the indicator from block 1010. The GUI may contain visualizations and textual descriptions that assist the agent in understanding the performance issue, including the data sources for the performance issue indicator, the subroutines associated with the performance issue indicator (if applicable), the severity of the performance issue, and so on. Alternatively, infrastructure remediation tool 620 could provide an indication of the performance issue raised by other means, such as phone call, email, or text message.

Note that the blocks represented in FIG. 10 are used for the purpose of example and are not intended to be limiting with respect to the embodiments herein. The operations of infrastructure remediation tool 620 may be highly configurable and may include more blocks, fewer blocks, or different blocks than those depicted in flow chart 1000. In some cases, one or more blocks may be customized, or may otherwise deviate from the exemplary description above.

Figure 11:
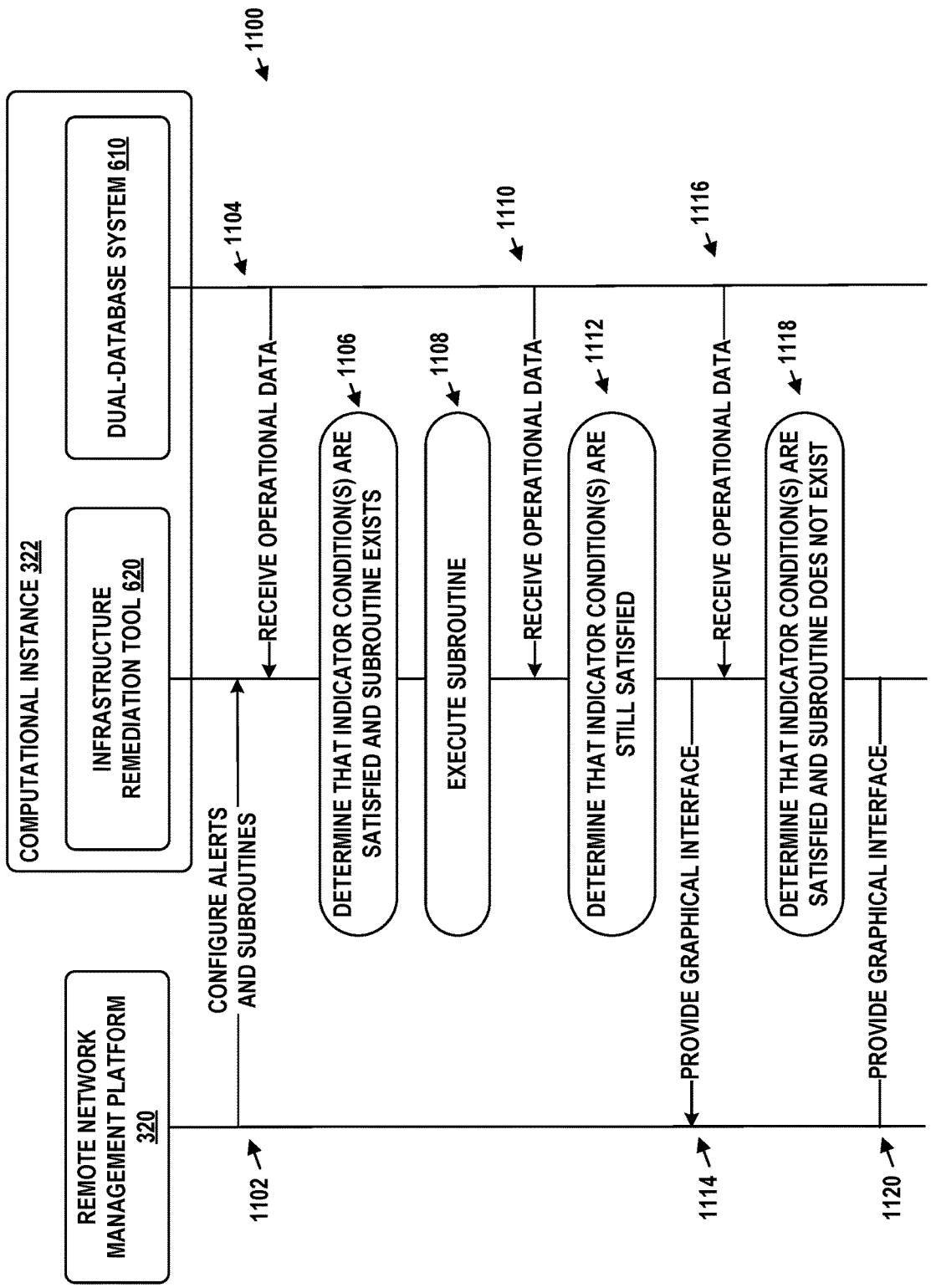
FIG. 11 depicts a message flow, in accordance with example embodiments.

FIG. 11 depicts message flow 1100, in accordance with example embodiments. In message flow 1100, a user from remote network management platform 320 configures one or more performance issue indicators and one or more subroutines for infrastructure remediation tool 620. With the performance issue indicators and subroutines configured, infrastructure remediation tool 620 could then determine if any of the configured performance issue indicators have conditions that are satisfied by operational data received from data-database system 610. By way of example, message flow 1100 may utilize remote network management platform 320, infrastructure remediation tool 620, and dual-database system 610 during operation. However, additional components, steps, or blocks, may be added to message flow 1100 without departing from the scope of this disclosure.

At step 1102, a user from remote network management platform 320 provides one or more performance issue indicators and one or more subroutines to infrastructure remediation tool 620. This may be accomplished, for example, by a GUI provided by computational instance 322 to a user from remote network management platform 320. The GUI may include feature(s) for establishing performance issue indicators and subroutines. Step 1102 could also be accomplished programmatically. For example, the user from remote network management platform 320 could provide the performance issue indicators and the subroutines by modifying the source code of infrastructure remediation tool 620. In some cases, step 1102 may be prompted by the user from remote network management platform 320, for example, by requesting the GUI from computational instance 322.

At step 1104, infrastructure remediation tool 620 may receive operational data from components of dual-database system 610. For instance, infrastructure remediation tool 620 may receive operational data from master database engine 612, replicated database engine 614, routing engine 616, replication engine 618, a defragmentation engine disposed within replication engine 618, or other components of dual-database system 610. In some embodiments, infrastructure remediation tool 620 may store the received operational data in a data structure suitable for time series data, for example, in round-robin database (RRD) files.

At step 1106, infrastructure remediation tool 620 may determine that one of the performance issue indicators configured at step 1102 has: (i) conditions that are satisfied by the operational data received at step 1104 and (ii) an associated subroutine. At step 1108, infrastructure remediation tool 620 may execute the associated subroutine.

At step 1110, infrastructure remediation tool 620 may receive additional operational data from components of dual-database system 610. In line with the discussion above, the time period between receiving operational data at step 1104 and receiving operational data at step 1110 may be X seconds (X=30, 60, 90, etc.), Y minutes (e.g., Y=1, 5, 10, 30, etc.), Z hours (e.g., Z=1, 2, 3, etc.) or some other time period.

At step 1112, infrastructure remediation tool 620 may perform another determination to establish that the performance issue indicator satisfied at step 1106 is still satisfied by the operational data received at step 1110. Since the indicator is still satisfied, the subroutine executed at step 1108 did not succeed in remediating the performance issue raised by the indicator. In line with the discussion above, the time period between the determination at step 1106 and the determination at step 1112 may be X seconds (X=30, 60, 90, etc.), Y minutes (e.g., Y=1, 5, 10, 30, etc.), Z hours (e.g., Z=1, 2, 3, etc.) or some other time period. Further, in some examples, the time period between steps 1106 and 1112 is greater than the time period between steps 1104 and 1110. In other examples, the time period between steps 1106 and 1112 is less than the time period between steps 1104 and 1110.

Because the performance issue was not remediated by the subroutine executed at step 1108, at step 1114, infrastructure remediation tool 620 provides to an agent on remote network management platform 320 a GUI (or phone call, email, or text message) containing information on the performance issue indicator satisfied at step 1106 as well as information on the subroutine that was executed at step 1108. Using this information, the agent could take manual actions to address the performance issue.

At step 1116, infrastructure remediation tool 620 could yet again receive operational data from components of dual-database system 610. At step 1118, infrastructure remediation tool 620 may determine that one of the performance issue indicators configured at step 1102: (i) has conditions that are satisfied by the operational data received at step 1116 and (ii) does not have an associated subroutine. Thus, because no subroutine can be executed, at step 1108, infrastructure remediation tool 620 could provide to an agent on remote network management platform 320 a GUI (or phone call, email, or text message) containing information on the performance issue indicator satisfied at step 1118. Using this information, the agent could take manual actions to address the performance issue.

Notably, the embodiments herein are not a mere automation of a previously-known set of techniques and procedures. One of the difficulties experienced in dual-database systems, such as the ones described herein, is that the database engines, replication engines, and routing engines in a high-volume environment can fail in a surprising number of ways. In the presence of these failures, it has been observed that human agents undertake root cause analysis procedures in an ad-hoc and subjective fashion. Each agent's personal experience may highly influence the steps that the agent takes.

These embodiments eliminate this subjectivity by having the system self-heal when it can. Based on the rules that associate conditions of the system to remediation subroutines, the system can self-correct in the presence of most failures that occur in practice. To that point, it has been observed that these embodiments can successfully address over 90% of observed failures through various remediation techniques, such as rebooting a device, restarting an application, refreshing a configuration file, deleting files, and so on. Further, these remediations occur rapidly, often within seconds or minutes of a potential or actual performance issue being discovered. Thus, the overall performance, reliability, and fault-tolerance of the system is greatly enhanced.

Further, the embodiments herein are not merely limited to dual-database systems, but could encompass any type of multi-database system. For example, some multi-database systems could include multiple replicated database engines (e.g., 3, 4, 5, 10, 100, etc.) and multiple replication engines (e.g., 3, 4, 5, 10, 100, etc.), with load balancers distributing queries to each of the multiple replicated database engines. In such examples, an infrastructure remediation tool could be configured to receive operational data from each of the multiple replicated database engines/multiple replication engines and process the operational data to determine whether performance issues are occurring on any of the multiple replicated database engines/multiple replication engines. If the infrastructure remediation tool determines that a performance issue has occurred on a particular one of the multiple replicated database engines/multiple replication engines, the infrastructure remediation tool could then take automated measures to alleviate the performance issue occurring on that particular replicated database engine/replication engine.

VI. Example Operations

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 involves obtaining a set of indicators that are respectively associated with performance issues that can occur in a database system, where each respective indicator defines one or more conditions that, when satisfied, cause the respective indicator to become active, where the database system contains a first database engine, a second database engine, and a replication engine configured to perform: (i) a replication process to replicate entries from the first database engine to the second database engine, and (ii) a defragmentation process to defragment the entries that are in the second database engine, and where the one or more conditions relate to the first database engine, the second database engine, the replication engine, the replication process, or the defragmentation process;

Block 1210 involves obtaining a set of mappings between: (i) at least some of the set of indicators, and (ii) remediation subroutines.

Block 1220 involves receiving operational data related to one or more of the first database engine, the second database engine, the replication engine, the replication process, or the defragmentation process.

Block 1230 involves determining, based on the operational data and the conditions defined by the set of indicators, that a particular indicator is active.

Block 1240 involves, responsive to the particular indicator being active, determining, based on the set of mappings, that the particular indicator has an associated remediation subroutine.

Block 1250 involves executing the associated remediation subroutine.

In some embodiments, the operational data is received from one or more of the first database engine, the second database engine, or the replication engine.

In some embodiments, each of the remediation subroutines addresses performance issues related to its associated indicator from the set of mappings.

Some embodiments involve (i) determining, based on the operational data and the conditions defined by the set of indicators, that a second particular indicator is active; (ii) responsive to the second particular indicator being active, determining, based on the set of mappings, that the second particular indicator does not have an associated subroutine; and (iii) assigning a performance issue associated with the second particular indicator to an agent.

In some embodiments, assigning the performance issue associated with the second particular indicator to the agent involves (i) generating, for display on a graphical user interface, a representation of the performance issue and the one or more conditions associated with the second particular indicator; and (ii) transmitting the representations as generated to a client device associated with the agent.

Some embodiments involve, after executing the associated remediation subroutine, (i) receiving additional operational data related to one or more of the first database engine, the second database engine, the replication engine, the replication process, or the defragmentation process; (ii) determining, based on the additional operational data, that the particular indicator is still active; and (iii) assigning a performance issue associated with the particular indicator to an agent.

Some embodiments involve (i) determining, based on the operational data and the conditions defined by the indicators, that a second particular indicator is not active; (ii) after determining that the second particular indicator is not active, receiving additional operational data related to one or more of the first database engine, the second database engine, the replication engine, the replication process, or the defragmentation process; (iii) determining, based on the additional operational data, that the second particular indicator is active; (iv) responsive to the second particular indicator being active, determining, based on the set of mappings, that the second particular indicator has an associated second remediation subroutine; and (v) executing the associated second remediation subroutine.

In some embodiments, receiving the additional operational data occurs after a first period of time from receiving the operational data and determining that the second particular indicator is active occurs after a second period of time from determining that the second particular indicator is not active. In such embodiments, the second period of time may be greater than the first period of time.

In some embodiments, obtaining the set of indicators involves (i) generating one or more graphical user interfaces with data entry elements for the one or more conditions of each of the set of indicators; (ii) providing, to a client device, a representation of the one or more graphical user interfaces; and (iii) receiving, from the client device and entered by way of the data entry elements, the one or more conditions of each of the set of indicators.

Some embodiments involve a routing engine configured to receive database queries and perform a routing process to route the database queries to either the first database engine or the second database engine. In such embodiments, the operational data could include data related to one or more of the routing engine or the routing process.

In some embodiments, the second database engine is a read-only replica of the first database engine.

In some embodiments, the second database engine is column-oriented database engine.

In some embodiments, the first data engine is an authoritative database engine for the database system.

In some embodiments, a system may include means for obtaining a set of indicators that are respectively associated with performance issues that can occur in a database system, where each respective indicator defines one or more conditions that, when satisfied, cause the respective indicator to become active, where the database system contains a first database engine, a second database engine, and a replication engine configured to perform: (i) a replication process to replicate entries from the first database engine to the second database engine, and (ii) a defragmentation process to defragment the entries that are in the second database engine, and where the one or more conditions relate to the first database engine, the second database engine, the replication engine, the replication process, or the defragmentation process. The system may also include means for obtaining a set of mappings between: (i) at least some of the set of indicators, and (ii) remediation subroutines. The system may additionally include means for receiving operational data related to one or more of the first database engine, the second database engine, the replication engine, the replication process, or the defragmentation process. The system may further include means for determining, based on the operational data and the conditions defined by the set of indicators, that a particular indicator is active. The system may yet further include means for, responsive to the particular indicator being active, determining, based on the set of mappings, that the particular indicator has an associated remediation subroutine. The system may also include means for executing the associated remediation subroutine.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a first database, a second database, and a replicator application configured to replicate data from the first database to the second database; and
   one or more processors configured to perform operations including:
      obtaining a set of indicators, wherein each respective indicator of the set of indicators defines one or more conditions that cause the respective indicator to become active, and wherein the one or more conditions relate to the first database, the second database, or the replicator application;
      determining, based on the conditions defined by the set of indicators and operational data related to one or more of the first database, the second database, or the replicator application, that a particular indicator is active; and
      responsive to the particular indicator being active, executing a particular remediation subroutine associated with the particular indicator.

2. The system of claim 1, further comprising:
   a defragmentation application configured to defragment the second database, wherein the one or more conditions also relate to the defragmentation application.

3. The system of claim 2, wherein the operational data also relates to the defragmentation application.

4. The system of claim 1, wherein the operations further include:
   obtaining a set of mappings between: (i) at least some of the set of indicators, and (ii) remediation subroutines, wherein the particular remediation subroutine is one of the remediation subroutines; and
   determining, based on the set of mappings, that the particular indicator is associated with the particular remediation subroutine, wherein executing the remediation subroutine is in response to the particular indicator being associated with the particular remediation subroutine.

5. The system of claim 1, wherein the operational data is received from one or more of the first database, the second database, or the replicator application.

6. The system of claim 1, wherein the particular remediation subroutine addresses performance issues related to the particular indicator.

7. The system of claim 1, wherein the operations further include:
   determining, based on the operational data and the conditions defined by the set of indicators, that a second particular indicator is active;
   responsive to the second particular indicator being active, determining that the second particular indicator does not have an associated remediation subroutine; and
   assigning a performance issue associated with the second particular indicator to an agent.

8. The system of claim 1, wherein the operations further include:
   after executing the particular remediation subroutine, receiving additional operational data related to one or more of the first database, the second database, or the replicator application;
   determining, based on the additional operational data, that the particular indicator is still active; and
   assigning a performance issue associated with the particular indicator to an agent.

9. The system of claim 1, wherein the operations further include:
   determining, based on the operational data and the conditions defined by the set of indicators, that a second particular indicator is not active;
   after determining that the second particular indicator is not active, receiving additional operational data related to one or more of the first database, the second database, or the replicator application;
   determining, based on the additional operational data, that the second particular indicator is active; and
   responsive to the second particular indicator being active, executing a second remediation subroutine.

10. The system of claim 9, wherein receiving the additional operational data occurs after a first period of time from receiving the operational data, wherein determining that the second particular indicator is active occurs after a second period of time from determining that the second particular indicator is not active, and wherein second period of time is greater than the first period of time.

11. The system of claim 1, wherein obtaining the set of indicators comprises:
generating one or more graphical user interfaces with data entry elements for the one or more conditions of each of the set of indicators;
providing, to a client device, a representation of the one or more graphical user interfaces; and
receiving, from the client device and entered by way of the data entry elements, the one or more conditions of each of the set of indicators.

12. The system of claim 1, further comprising:
a routing application configured to receive database queries and perform a routing process to route the database queries to either the first database or the second database, wherein the operational data further comprises data related to one or more of the routing application or the routing process.

13. The system of claim 1, wherein the second database is a read-only replica of the first database.

14. The system of claim 1, wherein the second database is a column-oriented database.

15. The system of claim 1, wherein the first database is an authoritative database for the system.

16. A computer-implemented method comprising:
obtaining a set of indicators, wherein each respective indicator of the set of indicators defines one or more conditions that cause the respective indicator to become active, and wherein the one or more conditions relate to a first database, a second database, or a replicator application configured to replicate data from the first database to the second database;
determining, based on the conditions defined by the set of indicators and operational data related to one or more of the first database, the second database, or the replicator application, that a particular indicator is active; and
responsive to the particular indicator being active, executing a particular remediation subroutine associated with the particular indicator.

17. The computer-implemented method of claim 16, further comprising:
determining, based on the operational data and the conditions defined by the set of indicators, that a second particular indicator is active;
responsive to the second particular indicator being active, determining that the second particular indicator does not have an associated remediation subroutine; and
assigning a performance issue associated with the second particular indicator to an agent.

18. The computer-implemented method of claim 16, further comprising:
after executing the particular remediation subroutine, receiving additional operational data related to one or more of the first database, the second database, or the replicator application;
determining, based on the additional operational data, that the particular indicator is still active; and
assigning a performance issue associated with the particular indicator to an agent.

19. The computer-implemented method of claim 16, wherein a routing application is configured to receive database queries and perform a routing process to route the database queries to either the first database or the second database, wherein the operational data further comprises data related to one or more of the routing application or the routing process.

20. An article of manufacture including a non-transitory computer-readable medium, having stored thereon program instructions that, upon execution by one or more processors disposed within a database system, cause the one or more processors to perform operations comprising:
obtaining a set of indicators, wherein each respective indicator of the set of indicators defines one or more conditions that cause the respective indicator to become active, and wherein the one or more conditions relate to a first database, a second database, or a replicator application configured to replicate data from the first database to the second database;
determining, based on the conditions defined by the set of indicators and operational data related to one or more of the first database, the second database, or the replicator application, that a particular indicator is active; and
responsive to the particular indicator being active, executing a particular remediation subroutine associated with the particular indicator.

\* \* \* \* \*